Sept. 4, 1934.　　　　F. F. NEWKIRK　　　　1,972,789
MACHINE FOR AND METHOD OF MAKING COMMUTATOR RINGS
Filed Feb. 8, 1930　　　3 Sheets-Sheet 1

Inventor:
Floyd F. Newkirk
By Cheever, Cox & Moore
Attys.

Sept. 4, 1934.   F. F. NEWKIRK   1,972,789
MACHINE FOR AND METHOD OF MAKING COMMUTATOR RINGS
Filed Feb. 8, 1930   3 Sheets-Sheet 2
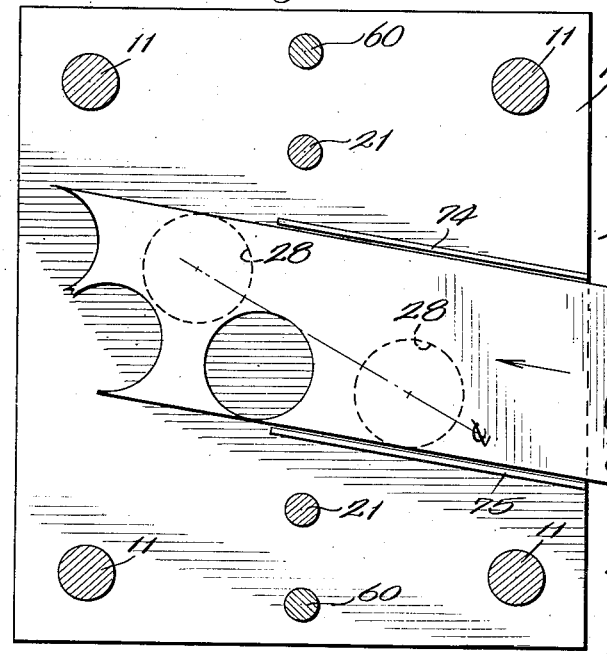
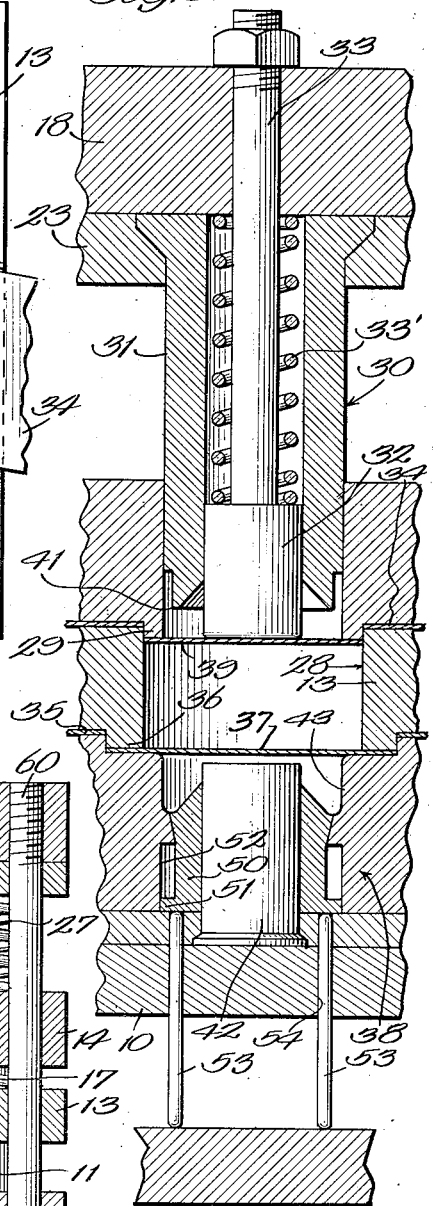
Inventor:
Floyd F. Newkirk
By Cheever, Cox & Moore
Attys.

Sept. 4, 1934.  F. F. NEWKIRK  1,972,789
MACHINE FOR AND METHOD OF MAKING COMMUTATOR RINGS
Filed Feb. 8, 1930  3 Sheets-Sheet 3
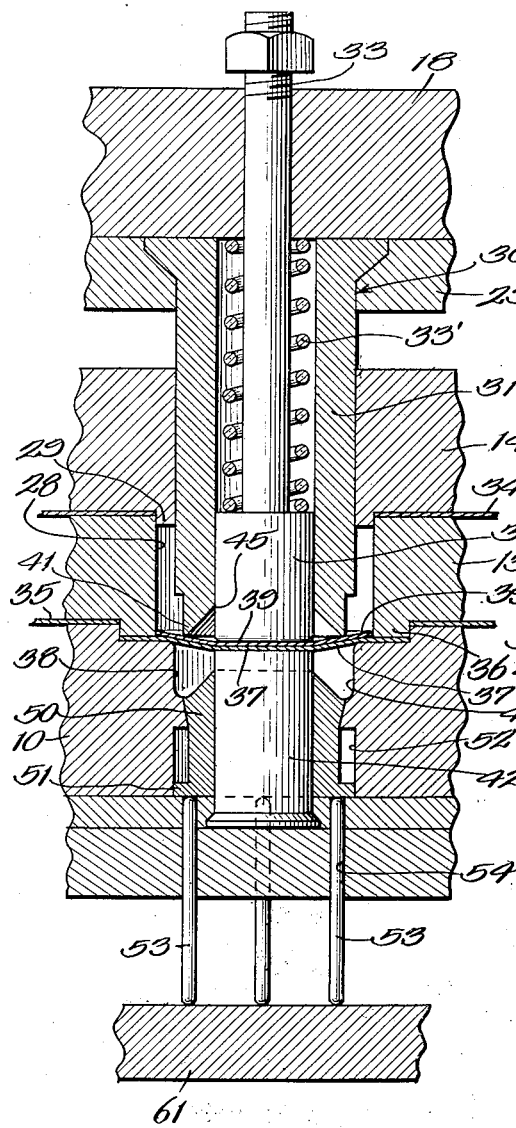
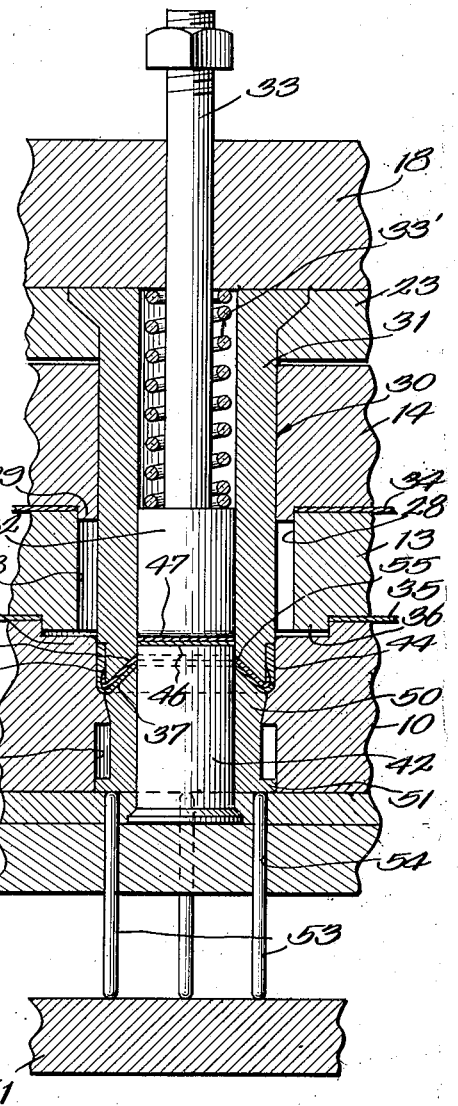
Inventor:
Floyd F. Newkirk
By Cheever, Cox & Moore Attys.

UNITED STATES PATENT OFFICE 1,972,789

MACHINE FOR AND METHOD OF MAKING COMMUTATOR RINGS

Floyd F. Newkirk, Valparaiso, Ind., assignor, by mesne assignments, to Continental Diamond Fibre Company, Newark, Del., a corporation of Delaware Application February 8, 1930, Serial No. 426,908

13 Claims. (Cl. 18—19)

This invention relates in general to dies and particularly to closing mold dies for making pressed articles.

The die of the present invention is especially adapted for use in making pressed products from composite mica sheets or mica plates as the material is more commonly referred to.

Mica plates are a well known product which comprises laminated sheets made by pasting individual mica flakes together by means of a suitable binder to form layers or mica boards of any desired or convenient thickness. The invention also contemplates a novel method of making pressed product from strips or sheets of mica plate or in fact, directly from strips of any suitable moldable material whatever.

The purpose of the invention is accomplished by first punching disks from the strips, alining the disks in stacked relation in the closing mold and then forming the article by pressing and configurating the disks together in the closing mold. The present mold is adapted to carry out the foregoing steps simultaneously in a single continuous operation, it being no longer necessary to preform the disks and aline them before pressing them into rings as has been the custom heretofore.

The primary object of the invention is to provide novel means to press mica articles directly from superimposed whole sheets of mica plate.

Another object is to provide a novel method of making reinforced mica articles such as commutator rings, and the like.

Another object of the invention is to provide a device for making composite mica articles wherein a portion of the articles made is reinforced by the accurate arrangement of a reinforcing layer on the article.

A further object is to provide a new and novel multiple mold having a plurality of die portions to accommodate moldable sheet material to best advantage and to feed the material to the dies in a particular manner.

A still further object is to provide a die for making reinforced insulating rings economically and accurately and to reduce the percentage of imperfect rings and to decrease the amount of waste material.

Numerous other objects and advantages will be apparent throughout the progress of the following specification.

The invention comprises in general a multiple mold having forming dies whereby two sheets of mica material are fed to the mold to be acted upon simultaneously by the forming dies. The sheets are preferably arranged one above the other, the lower sheet being acted upon first and having a pair of disks cut from the lower sheet simultaneously. These disks are held in position until disks from the upper sheet are cut and arranged in position relative to the disks cut from the lower sheet. The forming dies then operate simultaneously punching holes in the upper and lower disks at the same time and compressing them into the particular configuration required and for which the machine is particularly designed. It is preferable, however, that the mica sheets be heated when they are acted upon by the dies, and in order to conserve the material, the sheets are fed at an angle to a line drawn through the center of the forming dies, the forming dies being spaced rearwardly as well as laterally from each other.

The accompanying drawings illustrate a selected embodiment of the invention and the views therein are as follows:

Fig. 3 is a similar view showing the position in which the upper sheet is fed and the manner in which the disks are punched therefrom.

Fig. 4 is a detail elevation partly in section looking in the direction of the arrows 4—4 of Fig. 2.

Fig. 5 is a detail sectional view showing one complete forming die in operating position, the lower and upper disks being cut.

Fig. 6 is a view similar to Fig. 5 showing another stage of the forming operation.

Fig. 7 is a view similar to Figs. 5 and 6 showing the die at the end of the forming operation.

Figure 1:
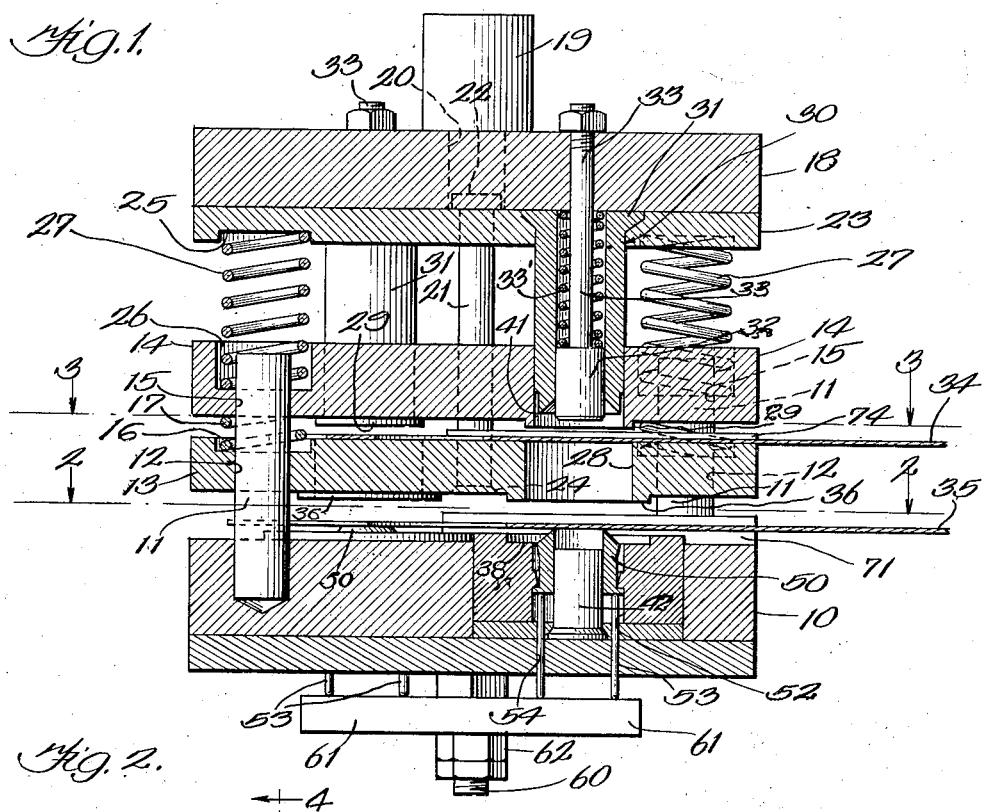
Fig. 1 is a vertical sectional view through the improved mold on the line 1—1 of Fig. 2.

Referring to the drawings, 10 designates a base having a plurality of upstanding pins 11 which extend through holes 12 to guide a plate 13 which is supported immediately above the base 10. An upper plate 14 is arranged above the plate 13 and is provided with holes 15 through which the pins 11 also extend. The plate 13 is provided with a recess or depression 16 into which a spring 17 is confined to form means for normally keeping the plates 14 and 13 in spaced relationship.

A top plate 18 is rigidly connected to a member 19 which is reciprocated by any suitable mechanism (not shown) for operating the dies.

This top plate 18 is provided with openings 20 through which pins 21 having heads 22 extend. The top plate 18 is provided with a cross member 23 which engages each head 22 of the pins, each pin 22 has its bottom 24 rigidly connected to the plate 13, Figs. 1 and 4. The purpose of the pins 21 is to make the plates 13 and 14 movable during movement of the top plate 18. The top plate 18 is provided with recesses 25 and the plate 14 is provided with recesses 26 into which springs 27 are confined for the purpose of spacing the plate 14 from the top plate and cross member 18 and 23 respectively.

The plate 13 is provided with openings 28 with which the punches 29 cooperate and through which the upper male dies 30 extend during reciprocation of the member 19 which causes reciprocation of the plates 13, 14 and 18, and the members associated therewith. Inasmuch as each die is exactly the same in construction, operation and shape, only one die will thus be described.

This male die 30 comprises a cylindrical portion 31 which is rigidly connected to the head or top plate 18 and carries a plunger 32 which is rigidly connected to a vertical rod 33. The vertical rod extends through the member 23 and the top plate 18 and is free to slide therethrough. A coil spring 33' is arranged about the rod 33 within the cylinder 31 to cause a pressure to be exerted against the plunger 32. The purpose of the plunger 32 is to punch out parts from disks punched from the mica sheets 34 and 35 during downward movement of the die 30. When the member 19 moves downwardly, the punch 36 on the bottom of the plate 13 will first engage the sheet 35 and then punch a disk 37 therefrom, Fig. 5. This disk will thus be held in position above the lower female forming die 38. Continued downward movement of the member 19 will then cause the plate 14 to move downwardly bringing the punch 29, Fig. 1, into position to punch out a disk 39, Fig. 5, from the top sheet 34. This disk 39 will then drop through the opening 28 and fall upon the disk 37 which has previously been punched from the lower sheet 35. In this position the plate 13 will be tightly against the base 10 and the plate 14 will be against the plate 13, the springs 17 being compressed during this downward movement of the member 19. This movement also causes the die 30 to slide through the plates 14 and 13 and as the plunger 32 is slightly in advance of the forming edge 41 of the upper die 30, the plunger will assist in pushing the disk 39 downwardly in the opening 28 until it contacts with the anvil 42 arranged in the base 10. The downward movement of the plunger 32 when it engages the anvil 42, will cause the disks 37 and 39 to attain the position above the lower female forming die 38 as shown in Fig. 6. The member 19 continues to move downwardly to complete the cycle of operation, causing the cylinder 31 to also move downwardly and bring the forming edge 41 of the die 30 into position against the die forming portion 43 of the lower forming die 38 to provide a reinforced commutator ring 44, Fig. 7. As the upper die 30 is compressing the disks to form a ring in the forming portion 43, the inner annular edge 45 of the upper forming die will cause small circular portions 46 and 47 respectively to be punched from the disks 37 and 39.

Figure 2:
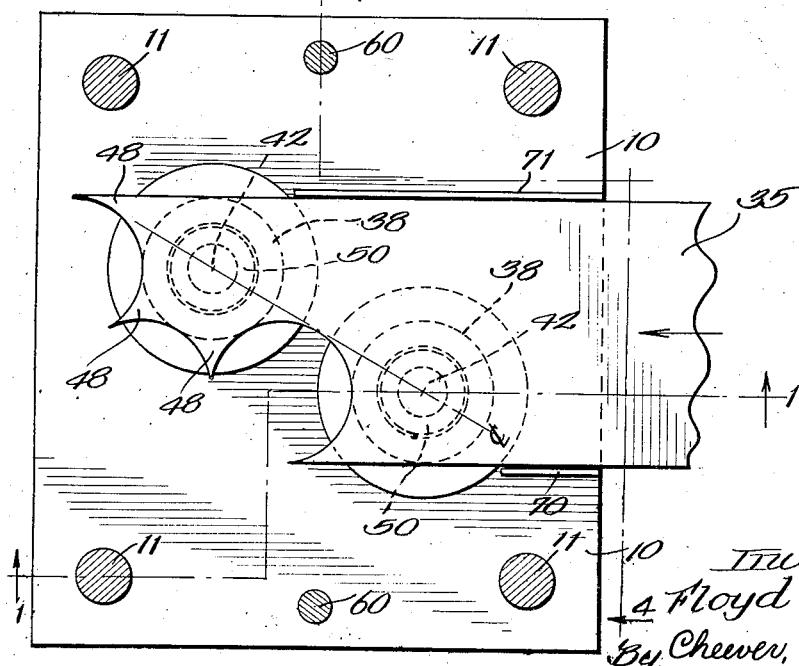
Fig. 2 is a detail plan section on the line 2—2 of Fig. 1, showing the manner in which the dies operate on the lower sheet.

One die is preferably spaced laterally and horizontally from the companion die as shown in Fig. 2 and the sheet 35 is fed at an angle of approximately 30 degrees from a center line drawn through the dies as clearly shown in Fig. 2. The positioning of the dies and the manner in which the sheet 35 is fed causes the disks 37 to be punched from the sheet 35 as indicated in Fig. 2, to reduce the waste to a minimum. It is to be noted that only small, substantially triangular portions 48 are wasted by cutting the disks from the sheet.

The sheet 34 is fed at an angle of substantially 20 degrees from a line drawn through the center of the dies as shown in Fig. 3. In other words, there is a variation of approximately 10 degrees between the feeding of the sheet 34 and the sheet 35. The disks 39 punched out from the upper sheet 34 being smaller than the disks 37 punched from the lower sheet 35, can thereby be pressed from a sheet which is considerably narrower than the lower sheet 35. The feeding of the sheet 34 at the angle described causes slightly more material to be wasted than if the dies were spaced parallel. The material saved, however, from the bottom sheet greatly makes up for the amount of material lost in the upper sheet inasmuch as the upper sheet is considerably narrower. The waste, however, may be saved and worked over or the larger pieces from the sheet 34 can be used for making smaller disks or rings or for any other purpose desired.

The device is capable of sufficient pressure for compressing the two rings together into the form shown in Fig. 7. The sheets are provided with sufficient adhesive for compressing the two rings together to form a single reinforced commutator ring 44. The sheets are preferably fed to feeding position while they are relatively hot and the compression is sufficient to form both the rings into a substantially integral, single commutator ring. The pressure of the dies causes the edge 49 of the disk 39 to be pressed into the lower ring as clearly shown in Fig. 7.

The lower forming die 38 includes a portion of the base 10 which is cut out to the configuration of the forming portion 43, and the anvil 42 has an annular forming member 50 arranged thereabout. This forming member 50 has restricted sliding movement relative to the anvil 42. The annular member is provided with a flange 51 which is free to operate in an annular groove 52 and is operated by pins 53 which extend through holes 54 in a part of the base 10 for pushing the annular forming member 50 upward in order to release the finished ring 44 from the lower forming die 38 when the die 30 moves upwardly.

The inner annular edge 55, Fig. 7, of the completed ring 44 carries with it the punched-out portions 46 and 47 from the disks 37 and 39, thereby clearing the die for the next succeeding operation.

Rods 60 extend loosely through the upper plate 18 and through the base 10 and are rigidly connected to a member 61 by any convenient means such as nuts 62 as shown in Fig. 4. As the upper die returns upwardly to normal position, the member 61 is carried with it by means of the rods 60 causing the pins 53 to operate against the annular member 50 to raise it sufficiently to kick the finished ring from the lower forming die 38. As the die returns downward for the next succeeding punching or cutting operation, the member 61 lowers with the other movable members causing the pins 53 to retract and permit the annular member 50 again to be rigidly supported and provide the forming portion 43 of the lower female die 38.

The base 10 is provided with upstanding members 70 and 71 to form a guide for feeding the lower mica sheet 35 to position relative to the dies. The plate 13 is provided with slots 72 and 73 which receive the members 70 and 71 respectively, Fig. 4. A guide is also provided for the upper mica plate 34 and this guideway comprises upstanding members 74 and 75 which are received in slots 76 and 77 respectively formed in the bottom of the plate 14, Fig. 4.

Operation

In operation, the plates 18, 14 and 13 will all move downwardly. The plate 13 will first engage the lower sheet 35 causing a disk 37 to be cut therefrom by means of the cutting die 36. Continued downward movement of the remaining parts caused by the downward movement of the member 19 will cause the punch 29 to punch a disk 39 from the upper sheet 34. This latter disk will then fall in the opening 28 and rest upon the disk cut from the lower sheet. Continued downward movement of the member 19 will then carry the die 30 downwardly until the plunger 32 impinges the two disks between the anvil 42 and the plunger 32 as shown in Fig. 6. The top plate then moves downwardly to move the die 30 into position to commence bending the commutator ring as clearly shown in Fig. 6. When the edge 45 of the die 30 passes about the upper edge of the anvil 42, circular portions 46 and 47 will be punched from the disks 37 and 39. Continued downward pressing movement of the die 30 relative to the lower forming die 38 causes the upper disk 39 to be formed integrally with the lower disk 37 causing the outer edge 49 of the upper disk 39 to merge into the lower disk 37. The sheets are provided with an adhesive binder to securely bind the reinforcing disk to the lower disk and complete it into an integral, reinforced commutator ring 44. As the member 19 returns upwardly, the member 61 will also be raised upwardly, causing the pins 53 to engage the annular member 50 and move the completed ring out of position in the lower forming die. The edges 55 of the ring 44, Fig. 7, will engage the punched-out portions 46 and 47 and permit the die to be cleared of any material acted upon when the sheets 34 and 35 will be advanced to have disks punched therefrom during the next downward movement of the die.

The invention provides new and novel means for completely performing in a continuous operation a completed, reinforced commutator ring from two sheets of constantly advancing mica material. The machine is efficient in operation, simple in construction, and permits reinforced commutator rings to be quickly and economically manufactured.

Changes may be made in the form, construction, and arrangement of the parts without departing from the spirit of the invention or sacrificing any of its advantages, and the right is hereby reserved to make all such changes in the mechanism and in the various steps of the method as fairly fall within the scope of the following claims.

The invention is hereby claimed as follows:

1. In a device of the character described, the combination of means for feeding a plurality of sheets, one above the other, to an operating station, means at said operating station for cutting superposed disks of unlike size from said sheets, means for maintaining the disks in superposed relationship while compacting the same to form, and means for ejecting the formed disks from the operating station.

2. In a device of the class described, the combination of means for feeding a plurality of sheets, one above the other, to a common work station, cutting means in said station for punching pieces of unequal size from said sheets, said cutting means comprising guide means to maintain the punched pieces stacked in vertical alignment, means to press the stacked and aligned pieces to a desired form while punching out the central portions thereof to form a unitary annular ring of desired cross-sectional configuration.

3. A machine for making mica insulating rings comprising a die member having means forming an annular groove therein, a co-operating die member shiftable toward and from the first mentioned die member, means formed in said members for punching out a disk from a strip of material introduced therebetween, a third die member extending above the second die member, co-operating means formed in said second and third members for punching a disk from a strip of material introduced therebetween and a forming member adapted to extend through said second and third members and adapted to co-operate with the groove forming means of the first mentioned die member to press therebetween the disks formed by the co-operation of the first, second and third members.

4. A machine for making insulating rings comprising a recessed die, means forming an annular groove in said recessed die, an annular projecting die for forcing work disks into said groove and means operable in response to the relative movement between said recessed and projecting dies for punching and stacking, in superposed relationship in said recessed die, disks of unequal size from strips of suitable material introduced into the die.

5. A drawing die for forming superposed sheets of semi-plastic material into finished articles, said die being formed to provide a pair of co-operating recessed die portions, one of said portions having an annular groove and the other having a ridge adapted to press the semi-plastic material into the annular groove to form the material therein, means to guide sheets of semi-plastic material one above the other into the die and between said relative movable parts, an auxiliary die member co-operating with said recessed die portion for cutting a piece of material from at least one of said sheets and centering same with respect to the recessed die portion and a second auxiliary die member co-operating with the first auxiliary member to cut a piece from another of said strips during the operation of the die, said auxiliary die portion co-operating with the projecting and recessed die portions to arrange the piece cut from said strips in superposed concentric arrangement between said relatively movable projecting and recessed die as a part of the operation of the device.

6. In a device of the class described, a die comprising a plurality of relatively shiftable portions, said portions including a recessed die part having means forming an annular groove therein, a co-operating die part having a ridge adapted to force work material into the groove of the recessed die when the parts are relatively closed and a plurality of relatively shiftable auxiliary die parts co-operating one with another and with the recessed die to cut disks from strips of material fed therebetween and stack said disks in superposed relationship between the recessed and the projecting die parts, means to guide the movement of the auxiliary die parts with respect to the recessed die, said auxiliary parts being formed to permit the projecting die to extend therethrough in order to co-operate with the recessed die part for the purpose of forming the disks cut from the sheets by the co-operation of the auxiliary and recessed die parts.

7. In a device of the class described, a recessed die and a relatively shiftable die part comprising a projecting die adapted to co-operate with the recessed die to form work material therein, auxiliary die means relatively shiftable with respect to the projecting die, said auxiliary die means comprising a first die part having a channel adapted to receive the projecting die, said part being formed with a ridge defining the outer edge of said channel and a second die part having a channel concentrically arranged with respect to the channel of the first part, the annular ridge of the first part being adapted, when the parts are in relatively closed position, to co-operate with said channel of the second part to form a cutting die whereby to punch a piece of material from a strip introduced between the parts, said second channel also having a ridge adapted to co-operate with a corresponding shoulder in the recessed die, said ridge and shoulder being formed in the assembly in concentric alignment with the annular groove of the recessed die whereby, when the parts are in closed position, the ridge and co-operating shoulder will operate to punch out a piece from a strip extending between the recessed die and said second die part, said projecting die, as the parts move to relatively closed position, being adapted to extend through the channels of said first and second die parts and to co-operate with the recessed die to form the punched out pieces therebetween.

8. The method of forming mica commutator rings, which comprises feeding strips of sheet mica, one above the other, along intersecting paths and simultaneously punching a cut-out piece from one of the strips and a larger piece from an adjacent strip at the moment said pieces, while still in the strip, are in vertical alignment at the point of intersection and finally forming the aligned pieces into rings having a desired cross-sectional configuration.

9. The method of forming rings from sheet material, which comprises feeding sheets of material, one above another, to a forming die, along converging paths, intersecting at the forming die, then compressing the die upon the sheets to punch out pieces of unequal size in stacked relationship from the sheets, and finally pressing the punched-out pieces in the die to form a grooved ring.

10. The method of forming rings from sheet material, which comprises feeding a plurality of sheets of material in stacked relationship to a common point, cutting out disks of unequal size from the said sheets at said common point to provide a stack of disks in vertical alignment and finally compressing the stack at said common point to form a single ring.

11. In a device of the character described, the combination of means forming spaced apart pressing dies, means for feeding a plurality of sheets, one above the other, to said dies, one of said sheets being wider than the other and being delivered to said dies along a path making an angle with the center lines of said spaced dies, another of said sheets being fed to said dies along a path making a different angle with the center line of said dies, means in each of said dies for cutting disks of unlike size from said sheets, and means for maintaining the cut disks in superposed relationship in the dies while compacting the same to form.

12. In a device of the character described, means forming a pair of spaced apart pressing dies, means forming a guideway for directing a strip of material of predetermined width to said dies along a path making an angle with the line of centers of the dies, means forming another guideway for directing another strip of material of different width to said dies along a path making a different angle with the line of centers of said dies, means formed in said dies for punching disks of predetermined size from the wider strip, means formed in said dies for punching disks of different size from the narrower strip, means for maintaining the punched disks in superposed relationship in the dies while compacting the same to form.

13. In a device of the character described, the combination of means forming spaced-apart pressing dies, means for feeding a plurality of sheets, one above the other, to said dies, one of said sheets being wider than the other and being delivered to said dies along a path making an angle with the center lines of said spaced dies, another of said sheets being fed to said dies along a path making a different angle with the center line of said dies, means in each of said dies for cutting disks of unlike size from said sheets, and means formed in said dies for aligning the disks in superposed relationship and maintaining the disks in alignment while compacting the same to form in the dies.

FLOYD F. NEWKIRK.